US010295696B2

(12) United States Patent
Hou (10) Patent No.: US 10,295,696 B2
(45) Date of Patent: May 21, 2019

(54) MULTI-COMPONENT INDUCTION LOGGING DATA PROCESSING IN NON-CIRCULAR BOREHOLES

(71) Applicant: Halliburton Energy Services, Inc, Houston, TX (US)

(72) Inventor: Junsheng Hou, Kingwood, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/515,928

(22) PCT Filed: Nov. 12, 2015

(86) PCT No.: PCT/US2015/060294
§ 371 (c)(1),
(2) Date: Mar. 30, 2017

(87) PCT Pub. No.: WO2017/082905
PCT Pub. Date: May 18, 2017

(65) Prior Publication Data
US 2018/0239047 A1 Aug. 23, 2018

(51) Int. Cl.
*G01V 3/10* (2006.01)
*G01V 3/28* (2006.01)
*E21B 49/00* (2006.01)
*G01V 3/30* (2006.01)
*G01V 3/38* (2006.01)

(52) U.S. Cl.
CPC ............. *G01V 3/28* (2013.01); *E21B 49/003* (2013.01); *G01V 3/30* (2013.01); *G01V 3/38* (2013.01)

(58) Field of Classification Search
CPC .................................................... E21B 49/003
See application file for complete search history.

(56) References Cited

U.S. PATENT DOCUMENTS

| 5,041,975 | A | 8/1991 | Minerbo et al. |
| 5,638,337 | A * | 6/1997 | Priest ................ G01V 1/50 367/27 |
| 5,999,883 | A | 12/1999 | Gupta et al. |
| 6,038,513 | A | 3/2000 | Varsamis et al. |
| 6,643,589 | B2 | 11/2003 | Zhang et al. |
| 6,760,666 | B2 | 7/2004 | Hagiwara |
| 6,819,111 | B2 | 11/2004 | Fanini et al. |
| 6,900,640 | B2 | 5/2005 | Fanini et al. |
| 6,903,553 | B2 | 6/2005 | Itskovich et al. |
| 6,925,384 | B2 | 8/2005 | Frenkel et al. |
| 7,268,555 | B1 | 9/2007 | Rabinovich et al. |

(Continued)

FOREIGN PATENT DOCUMENTS

| WO | WO 2011/091216 A2 | 7/2011 |
| WO | WO 2011/123379 A1 | 10/2011 |
| WO | WO 2014/042621 A1 | 3/2014 |

OTHER PUBLICATIONS

International Search Report and the Written Opinion of the International Search Authority, or the Declaration, dated Aug. 9, 2016, PCT/US2015/060294, 17 pages, ISA/KR.

*Primary Examiner* — Clayton E. LaBalle
*Assistant Examiner* — Jas A Sanghera (57) ABSTRACT

The processing of multicomponent induction ("MCI") data in non-circular, or elliptical, boreholes is achieved through the use of borehole formation models generated using elliptical borehole characteristics.

42 Claims, 7 Drawing Sheets

(56) References Cited

U.S. PATENT DOCUMENTS

| | | |
|---|---|---|
| 7,269,515 B2 | 9/2007 | Tabarovsky et al. |
| 7,386,430 B2 | 6/2008 | Barber et al. |
| 7,657,375 B2 | 2/2010 | Wang et al. |
| 7,778,778 B2 | 8/2010 | Bespalov et al. |
| 8,200,437 B2 | 6/2012 | Davydycheva et al. |
| 8,433,518 B2 | 4/2013 | Omeragic et al. |
| 8,624,969 B2 | 1/2014 | Zhdanov |
| 2005/0256642 A1 | 11/2005 | Barber et al. |
| 2007/0024286 A1 | 2/2007 | Wang |
| 2008/0078242 A1 | 4/2008 | Hassan et al. |
| 2010/0082255 A1 | 4/2010 | Davydycheva et al. |
| 2013/0073206 A1* | 3/2013 | Hou ................... G01V 3/28 702/7 |
| 2013/0261974 A1 | 10/2013 | Stewart et al. |

* cited by examiner

MULTI-COMPONENT INDUCTION LOGGING DATA PROCESSING IN NON-CIRCULAR BOREHOLES

PRIORITY

The present application is a U.S. National Stage patent application of International Patent Application No. PCT/US2015/060294, filed on Nov. 12, 2015, the benefit of which is claimed and the disclosure of which is incorporated herein by reference in its entirety.

FIELD OF THE DISCLOSURE

The present disclosure relates generally to downhole logging and, more specifically, to processing multi-component induction ("MCI") logging measurements in non-circular boreholes.

BACKGROUND

Downhole logging tools are utilized to acquire various characteristics of earth formations traversed by the borehole, as well as data relating to the size and shape of the borehole itself. The collection of information relating to downhole conditions, commonly referred to as "logging," can be performed by several methods including wireline logging, "logging while drilling" ("LWD") and "measuring while drilling" ("MWD").

Many boreholes have a non-circular (or oval) shape after drilling, especially in deviated and horizontal wells. As a result of the tectonic forces, the oval shape is created due to the effect of pressures in the crust being different in different directions. Currently, multi-component induction data processing methods based on circular-hole models are available for the well logging industry. As a result, when the borehole has a non-circular shape, the acquired formation properties (e.g., resistivity and dip) are inaccurate because they are based on circular borehole models.

DESCRIPTION OF ILLUSTRATIVE EMBODIMENTS

Illustrative embodiments and related methodologies of the present disclosure are described below as they might be employed in methods and systems to process MCI data acquired in non-circular boreholes. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, illustrative systems and methods of the present disclosure are directed to processing MCI measurement data acquired in non-circular boreholes. In a generalized method, an MCI logging tool is deployed downhole along a non-circular borehole, and MCI measurement signals are acquired. A borehole formation model is generated using characteristics of the non-circular borehole, and the acquired MCI measurement signals are processed using the borehole formation model. Formation property data corresponding to the processed MCI measurement signals are then output.

The generalized method may be implemented in two ways. In a first method, electromagnetic and geometric equivalence is utilized to generate the borehole formation model. In this method, the non-circular (or elliptical) borehole characteristics of the borehole are determined. Circular borehole characteristics equivalent to the elliptical borehole characteristics are then determined. The equivalent borehole characteristics are utilized to generate the borehole formation model, thereby creating a circular borehole model. The borehole effects of the MCI measurement signal is then removed using a radially one-dimensional ("R1D") inversion based on the circular borehole model, resulting in highly accurate processing of the formation property data.

In the second method, the MCI data processing is accomplished using a borehole formation model based on an elliptical borehole with a full space (zero-dimensional or "0D") formation. In this method, an R1D inversion of the MCI measurement signal is conducted using the circular borehole formation model mentioned above. Another R1D inversion of the MCI measurement signal is then performed using an elliptical borehole model. Thereafter, the borehole effects of the MCI measurement signal are removed using the R1D inversion of the elliptical borehole model, thereby resulting in highly accurate formation property data.

Therefore, as described herein, a novel data processing method of MCI measurements in non-circular boreholes is provided through the use of a circular borehole model or a non-circular (or oval) borehole model. Once the methods are performed, the processed formation anisotropy (horizontal and vertical resistitivities), dip (and azimuth), and corrected induction logs, as well as the oval identification index ("OII") can be obtained. These and other advantages of the present disclosure will be apparent to those ordinarily skilled in the art having the benefit of this disclosure.

As will be noted throughout this disclosure, the real borehole cross section can be circular or non-circular (or oval). For the non-circular or oval shape, it is geometrically a plane curve named after René Descartes, the set of points that have the same linear combination of distances from two fixed points in a Cartesian system. As such, their shape does not depart much from that of an ellipse. Therefore, in the following description, a borehole having an oval shape is assumed and mathematically described as an ellipse.

As will be understood by those ordinarily skilled in the art having the benefit of this disclosure, a circle is defined as a closed curved shape that is flat. That is, it exists in two dimensions or on a plane. In a circle, all points on the circle are equally far from the center of the circle. In contrast, an ellipse is also a closed curved shape that is flat. However, all points on the ellipse are not the same distance from the center point of the ellipse.

Figure 1:
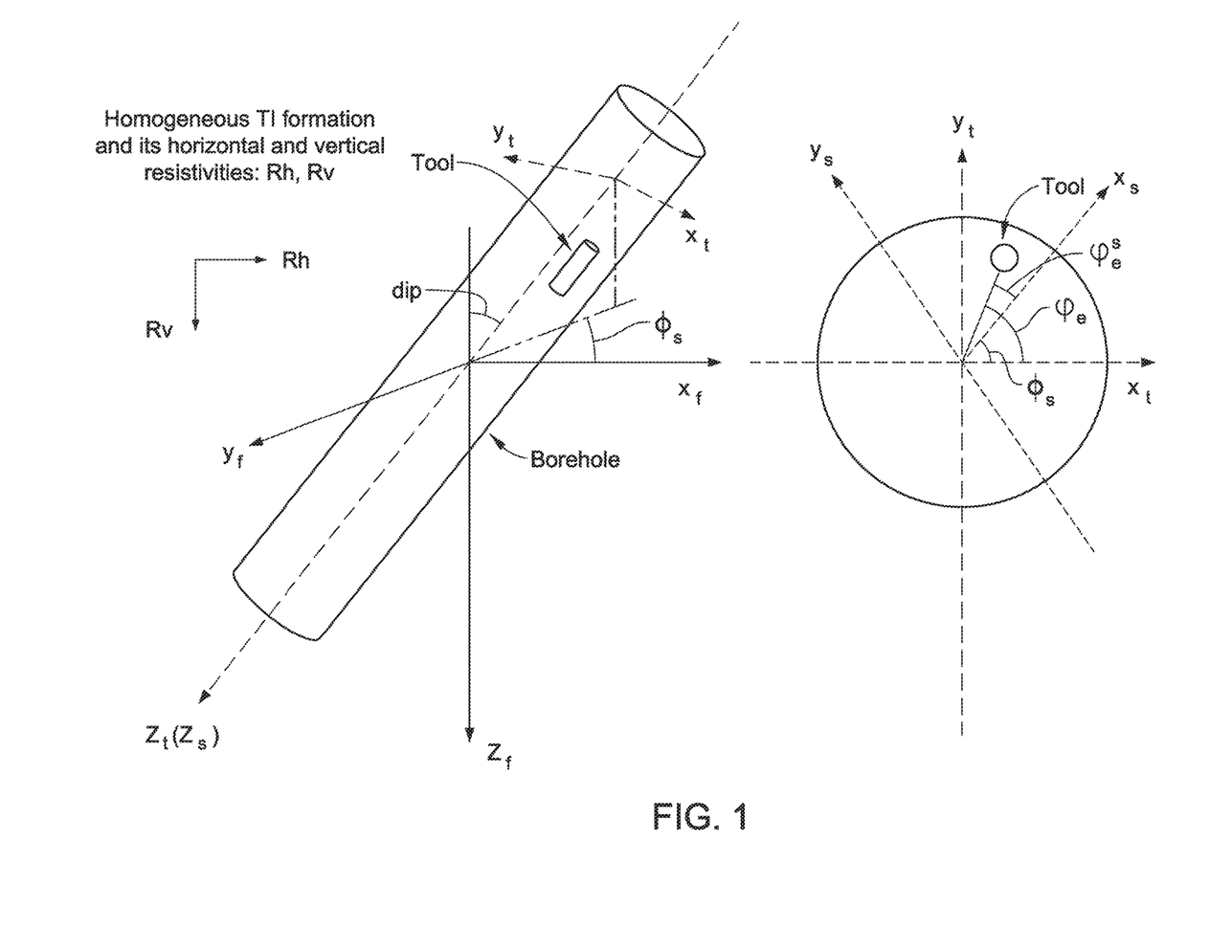
FIG. 1 illustrates a 3D side view and a top-down 2D view of a circular borehole formation model used for MCI data processing, according to certain illustrative methods of the present disclosure.

FIG. 1 illustrates a 3D side view and a top-down 2D view of a circular borehole formation model used for MCI data processing, according to certain illustrative methods of the present disclosure. The circular borehole formation model consists of a circular-shaped hole surrounded by a full-space (or 0D) transversely isotropic ("TI") formation, which is used for R1D inversion and MCI borehole correction. The left panel is its 3D view and the right panel is its top 2D view in the $x_t$-$y_t$ plane. In this example, ($x_t$, $y_t$, $z_t$) is the tool/measurement coordinate system, ($x_f$, $y_f$, $z_f$) is the formation coordinate system, and ($x_s$, $y_s$, $z_s$=$z_t$) is the strike coordinate system.

The borehole shape is described by a parameter of the circle radius or diameter, frequently denoted by r. In FIG. 1, this model usually consists of a borehole with a circular cross section surrounded by an infinitely thick homogeneous formation. The borehole may be vertical or deviated, and the MCI logging tool can be centralized or decentralized in the borehole. An illustrative MCI logging tool is the Xaminer™-MCI logging tool, which is commercially available through Halliburton Energy Services, Inc. of Houston, Tex. Formation resistivity/conductivity can be isotropic or anisotropic. Numerical simulations show that for a given subarray operated at a given frequency, the MCI apparent conductivity tensor $\overline{\overline{\sigma}}_a$ with nine components depends on the following nine borehole-formation parameters:

Rh=the formation horizontal resistivity (or horizontal conductivity) in ohm-m.

Rv=the formation vertical resistivity (or vertical conductivity) in ohm-m.

Rvh=the anisotropic ratio (Rvh=Rv/Rh).

φ=the formation/borehole strike or azimuth, in degrees.

r=the borehole radius, in inches or meters.

$R_m$=the borehole mud resistivity, in ohm-m.

$d_e$=the MCI logging tool's eccentric distance, given by the distance from the borehole center to the center of the tool, or as an eccentricity ratio (ecc=$d_e$/r).

$\varphi_e$=the MCI logging tool eccentricity azimuthal angle in the tool/measurement coordinate system. Moreover, $\varphi_e^s$ is the tool eccentricity angle in the strike system $\varphi_e^s$=$\varphi e$−$\phi_s$, in degrees.

dip=the relative dip angle between the formation and borehole, in degrees.

Based on the circular borehole model of FIG. 1, an MCI response library (i.e., modeled tool responses) can be pre-calculated (before real measurement data is acquired by the logging tool) by using a numerical simulation algorithm such as, for example, the three-dimensional finite difference ("3DFD") method or three-dimensional finite element ("3DFE"). Once the MCI response library is pre-populated, it is then also used as the forward engine in processing the subsequent MCI measurement data acquired during logging operations.

In certain methods of the present disclosure, the MCI logging tool is combined with a multi-arm caliper tool (e.g., Halliburton Energy Services, Inc.'s LOGIQ® Caliper Tool), which is used for determining the borehole shape (i.e., circular or elliptical borehole characteristics) and tool position inside the borehole (e.g., tool eccentricity and its azimuthal angle). In those cases where the borehole is elliptically shaped, once the borehole shape and tool position are determined, the equivalent circular radius (i.e., equivalent circular borehole characteristics) can be pre-calculated by the following equations:

$$\pi r^2 = \pi ab \quad (1a), \text{ and}$$

$$r = \sqrt{ab} \quad (1b), \text{ or}$$

$$\pi r^2 = 1/2\pi(a^2+b^2) \quad (2a), \text{ and}$$

$$r = \sqrt{(1/2(a^2+b^2))} \quad (2b).$$

Here, in Equations (1a) and (1b), a is the half length of the major axis and b is the half length of the minor axis of an ellipse, which are evaluated from the multi-arm caliper measurements. In other words, an ellipse is replaced by an equivalent circle with a radius denoted by r, which is the geometric mean of a and b. Alternatively, the radius r is calculated by Equations (2a) and (2b) where the radius r is the root-mean-square (RMS) average of a and b. Finally, the following arithmetic average equation (3) may then be used to determine the radius of the equivalent circle:

$$r = 1/2(a+b) \quad (3).$$

Thus, the equivalent circular borehole characteristics are utilized to generate the circular borehole model.

In view of this geometric area and electromagnetic field equivalence described above, FIG. 2 provides a flow chart of a method 200 for data processing of MCI measurement signals using a circular borehole model, according to certain illustrative methods of the present disclosure. At block 202, a borehole formation model is generated based upon elliptical borehole characteristics as described above in relation to FIG. 1. The borehole characteristics may be, for example, the borehole shape and tool position inside the borehole (e.g., tool eccentricity or azimuthal angle). These elliptical borehole characteristics may be acquired from the actual borehole in which the MCI logging tool is deployed (e.g., acquired using a caliper tool), other similar boreholes, or borehole models.

Figure 2:
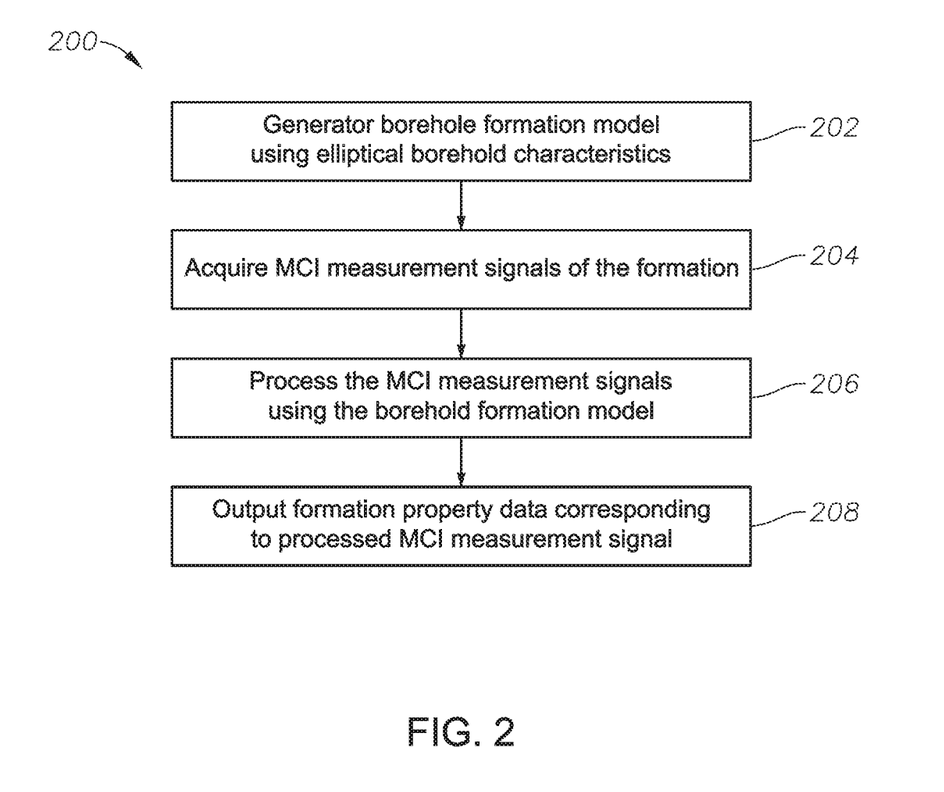
FIG. 2 provides a flow chart of a method for data processing of MCI measurement signals using a circular borehole model, according to certain illustrative methods of the present disclosure.

As will be described in more detail below, the borehole formation model may be generated in one of two ways. In a first method, the elliptical borehole characteristics may be converted into equivalent circular borehole characteristics, which are then used to generate a circular borehole model. Alternatively, the elliptical borehole characteristics are used to generate an elliptical borehole model, which will also be described in more detail below.

At block 204, after the MCI logging tool has been deployed downhole into the borehole, one or more MCI measurement signal(s) of the formation are acquired using the MCI logging tool. At block 206, the MCI measurement signal(s) are then processed using the borehole formation model. At block 208, formation property data which corresponds to the processed MCI measurement signal(s) are then output as desired.

Figure 3:
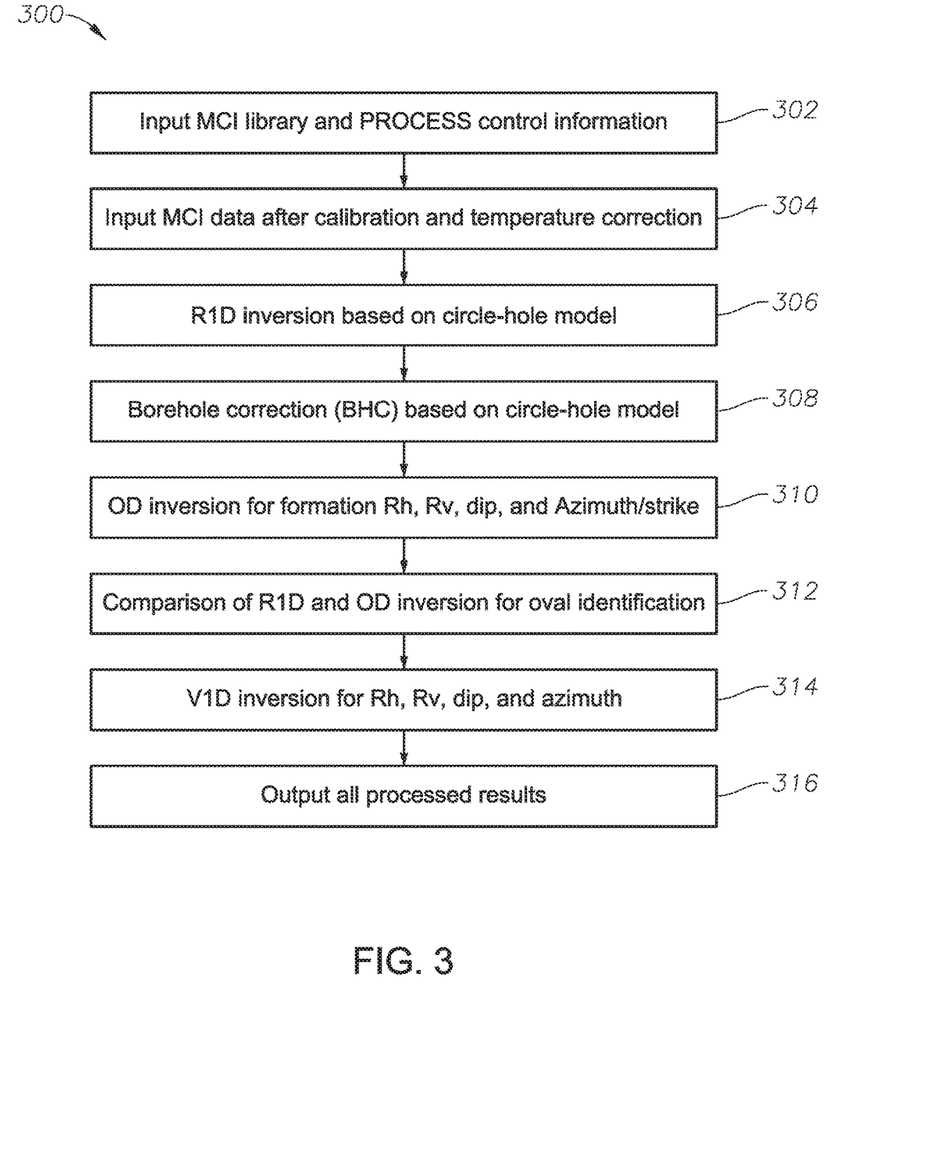
FIG. 3 illustrates a method for processing the MCI measurement signals using a circular borehole model, according to certain illustrative methods of the present disclosure.

FIG. 3 illustrates a method 300 for processing the MCI measurement signals using a circular borehole model, according to certain illustrative methods of the present disclosure. At block 302, the MCI library and process control information is input into the logging system database. As previously described, the MCI response library may be generated using data pre-calculated by numerical simulation algorithms performed on the circular borehole model of FIG. 1. This same circular borehole model will be used later as the forward engine to process the acquired MCI measurement signals. The process control information input here may be, for example, the sample rate of the logging tool, mud type, or logging direction.

After the MCI logging tool is deployed downhole and MCI measurement signal(s) are acquired, the MCI measurement signal data is calibrated and temperature corrected, and then input into the circular borehole model at block 304. Calibration and temperature correction is necessary because the raw measured data are induction voltages which are affected by downhole temperatures. At block 306, a radially one-dimensional ("R1D") inversion of the MCI measurement signal(s) is performed using the circular borehole model.

In the R1D inversion of block 306, the inverted formation horizontal and vertical resistivities (Rh and Rv) and dip are not the true formation parameters if the cross section of the borehole is elliptical in nature. In such cases, Rh, Rv and dip are only equivalents of the true formation parameters. However, these equivalent formation parameters are then utilized in block 308 for borehole correction based on the circular borehole model. Once borehole correction is complete, a zero-dimensional ("0D") inversion of the borehole corrected MCI measurement signal data is performed at block 310, thereby resulting in the true formation Rh, Rv, dip, and/or azimuth/strike. Here, the 0D inversion is based on a full-space homogeneous formation model.

In certain illustrative methods, oval identification of the borehole may be performed at block 312. Here, the R1D and 0D inverted MCI measurement signal data is compared to determine if the borehole shape is circular or elliptical by computing the following oval identification index ("OII"):

$$OII = w_{Rh}\Delta_{Rh} + w_{Rv}\Delta_{Rv} + w_{dip}\Delta_{dip} \quad (4).$$

Here, $w_{Rh}, w_{RV}$ and $w_{dip}$ are the weighted coefficients for formation Rh, Rv, and dip and $w_{Rh} + w_{Ry} + w_{dip} = 1$. The weighted coefficients are a function of tool spacing, frequencies, Rh, Rv, and dip sensitivity to the hole shape. $\Delta_{Rh}$, $\Delta_{Rv}$, and $\Delta_{dip}$ are determined by using the following three equations:

$$\Delta_{Rh} = \frac{2|Rh^{(R1D)} - Rh^{(0D)}|}{Rh^{(R1D)} + Rh^{(0D)}} \times 100 \Delta_{Rh} = \frac{2|Rh^{(R1D)} - Rh^{(0D)}|}{Rh^{(R1D)} + Rh^{(0D)}} \times 100, \quad (5a)$$

$$\Delta_{Rv} = \frac{2|Rv^{(R1D)} - Rv^{(0D)}|}{Rv^{(R1D)} + Rv^{(0D)}} \times 100, \text{ and} \quad (5b)$$

$$\Delta_{dip} = \frac{2|dip^{(R1D)} - dip^{(0D)}|}{dip^{(R1D)} + dip^{(0D)}} \times 100. \quad (5c)$$

In Equations (5a), (5b), and (5c) above, $Rh^{(R1D)}$, $Rv^{(R1D)}$, and $dip^{(R1D)}$ are the inverted results of the three formation parameters from the R1D inversion at block 306, and $Rh^{(0D)}$, $Rv^{(0D)}$, and $dip^{(0D)}$ are the inverted results from the 0D inversion at block 310. From those 3 equations, it can be seen how the OII is very close to zero if the borehole is circular while ignoring the shoulder bed effects. Accordingly, the above equations are utilized to identify if the borehole is circular or ellipse at block 312.

Since the 0D inversion ignores the layer effect of the formation as it pertains to the resistivity data, certain illustrative methods of the present disclosure also perform a vertically one-dimensional ("V1D") inversion of the borehole corrected MCI measurement signal(s) at block 314. Here, the V1D inversion takes into account the layer effects of the formation. The final processed data/results are output at block 316.

Accordingly, the illustrative processing method described above not only delivers the formation Rh, Rv, dip, and azimuth in real-time, but also provides the borehole shape information. Once the borehole shape is known, this data may be used for subsequent geological stress analysis.

Figure 4:
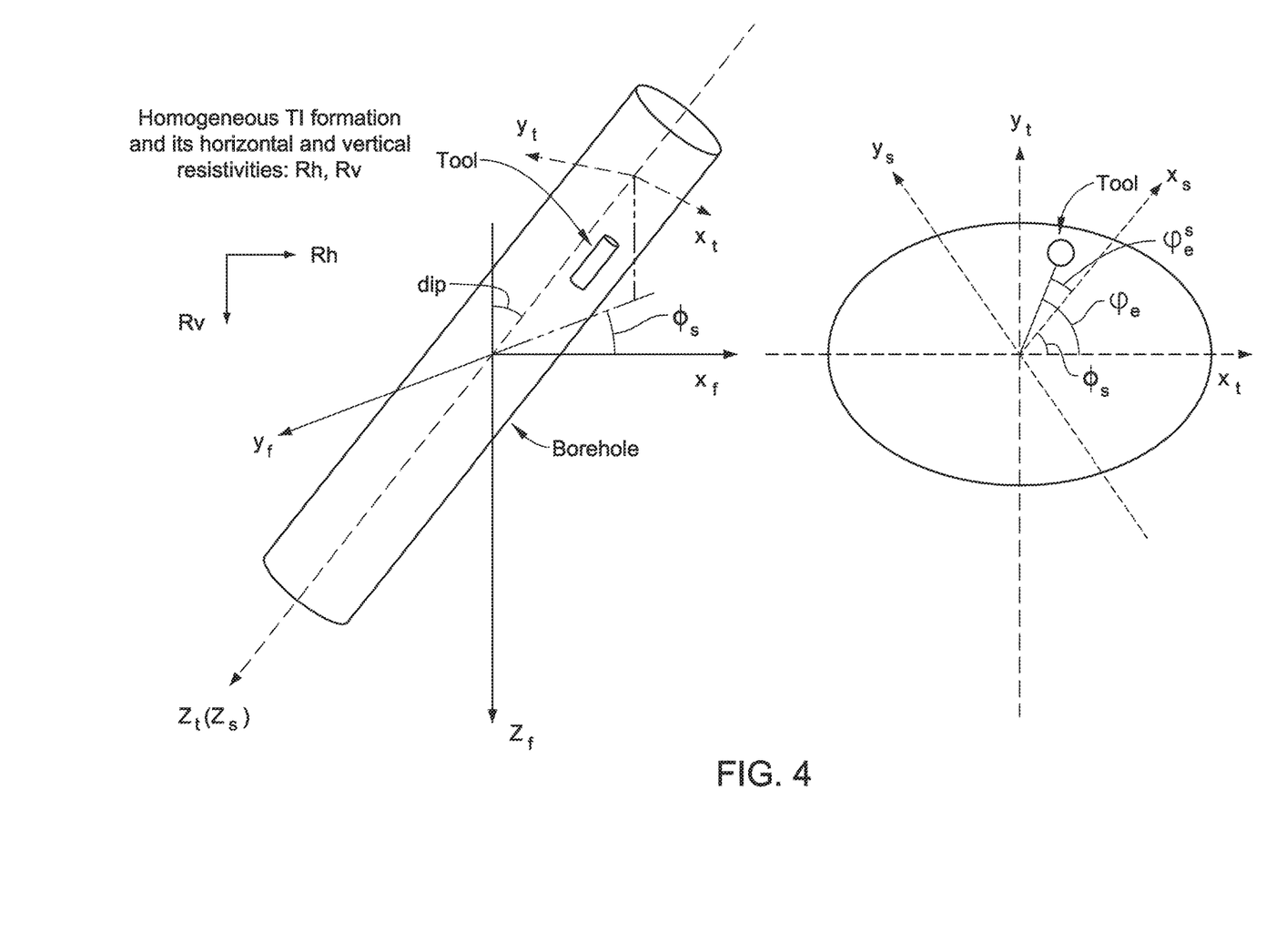
FIG. 4 illustrates a 3D side view and a top-down 2D view of an elliptical borehole formation model used for MCI data processing, according to certain alternative illustrative methods of the present disclosure.

FIG. 4 illustrates a 3D side view and a top-down 2D view of an elliptical borehole formation model used for MCI data processing, according to certain alternative illustrative methods of the present disclosure. An elliptical borehole model used for the MCI data processing is shown in FIG. 4, in which the borehole shape is described by a parameter of the circle radius or diameter, frequently denoted by r. The elliptical borehole model consists of an ellipse-shaped borehole surrounded by a full-space (or 0D) TI formation used for R1D inversion and MCI borehole correction. All others variables are the same as those of FIG. 1. The primary difference is the ellipse-shaped hole replaces the circular hole, which leads to the hole shape being described by two basic parameters of the major axis a and the minor axis b of an ellipse. FIG. 4 shows the elliptical model as being described by the following parameters: Rh, Rv (or Rvh), $\phi_s$, borehole major and minor radius a and b, $R_m$, $d_e$ (or $ecc = 2d_e/(a+b)$), and $\varphi_e$ or $(\varphi_e - \phi_s)$. Based on this model, the MCI response library is again pre-built by using the fast and accurate electromagnetic algorithms, such as, for example, 3DFD or 3DFE numerical methods previously described. As such, the MCI response library includes the modeled tool responses of both the circular and elliptical borehole models. In the same way, the elliptical borehole model is also used as the forward engine in the MCI data processing.

Figure 5:
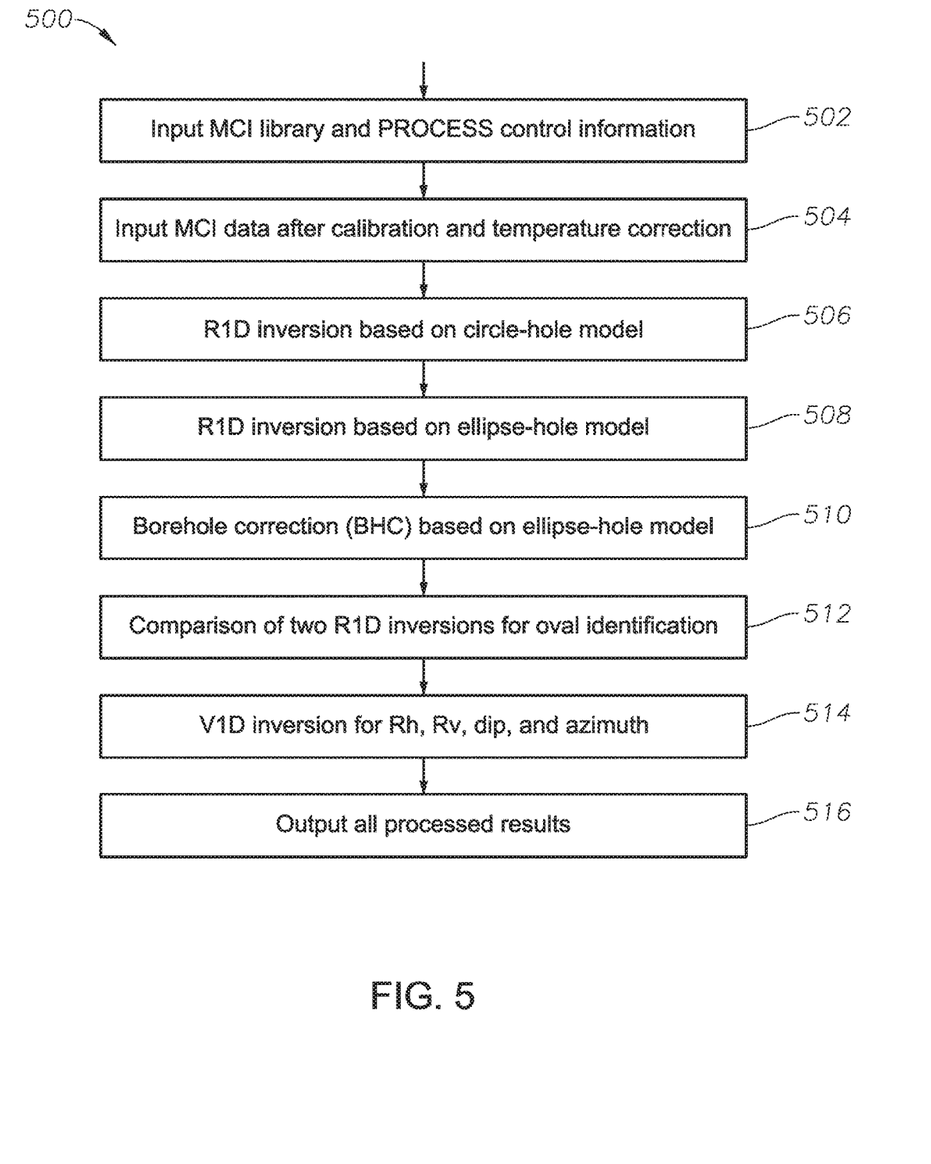
FIG. 5 illustrates a method for processing the MCI measurement signals using an elliptical borehole model, according to certain illustrative methods of the present disclosure.

FIG. 5 illustrates a method 500 for processing the MCI measurement signals using an elliptical borehole model, according to certain illustrative methods of the present disclosure. When comparing method 300 to method 500, it can be seen that the workflows have some similarities, but there are also some differences. At block 502, the MCI library and process control information are again input into the logging system database. After the MCI measurements are acquired, they are calibrated and temperature corrected at block 504, also previously described.

In order to determine the initial borehole diameter, Equations (1a)-(3) are utilized. Here, two MCI libraries are necessary: one based on the circular borehole model, and the other based on the elliptical borehole model. At block 506, a R1D inversion of the MCI measurement signal(s) is performed using the circular borehole model. This R1D inversion based on the circle model provides the initial estimate for all inverted parameters. At block 508, a R1D inversion of the MCI measurement signal(s) is performed using the elliptical borehole model. At block 510, borehole effects are removed from the MCI measurement signal(s) using the R1D inverted measurement signal(s) of the elliptical borehole model, whereby the borehole correction of block 510 provides the final output of Rh, Rv, Dip, and so on.

Thereafter, in alternative methods, the shape of the borehole may be determined at block 512. Here, the two R1D inversions of the circular and elliptical borehole models are compared to compute the oval identification. In block 512, the following equations are utilized:

$$\Delta_{Rh} = \frac{2|Rh^{(ell)} - Rh^{(cir)}|}{Rh^{(ell)} + Rh^{(cir)}} \times 100, \tag{6a}$$

$$\Delta_{Rv} = \frac{2|Rv^{(ell)} - Rv^{(cir)}|}{Rv^{(ell)} + Rv^{(cir)}} \times 100, \text{ and} \tag{6b}$$

$$\Delta_{dip} = \frac{2|dip^{(ell)} - dip^{(cir)}|}{dip^{(ell)} + dip^{(cir)}} \times 100. \tag{6c}$$

In equations (6a), (6b), and (6c) above, $Rh^{(ell)}$, $Rv^{(ell)}$, and $dip^{(ell)}$ are the inverted results of the three formation parameters from the R1D inversion based on the elliptical borehole model, and $Rh^{(cir)}$, $Rv^{(cir)}$, and $dip^{(cir)}$ are the inverted results from the R1D inversion based on the circular borehole model. At block 514, a V1D inversion of the borehole corrected MCI measurement signal(s) is performed in order to determine the formation property values of Rh, Rv, dip and azimuth. Thereafter, all processed log data are output for other applications, such as, for example, the calculation of sand Rt (which is the sandstone resistivity) and oil/gas saturation.

Figure 6A:
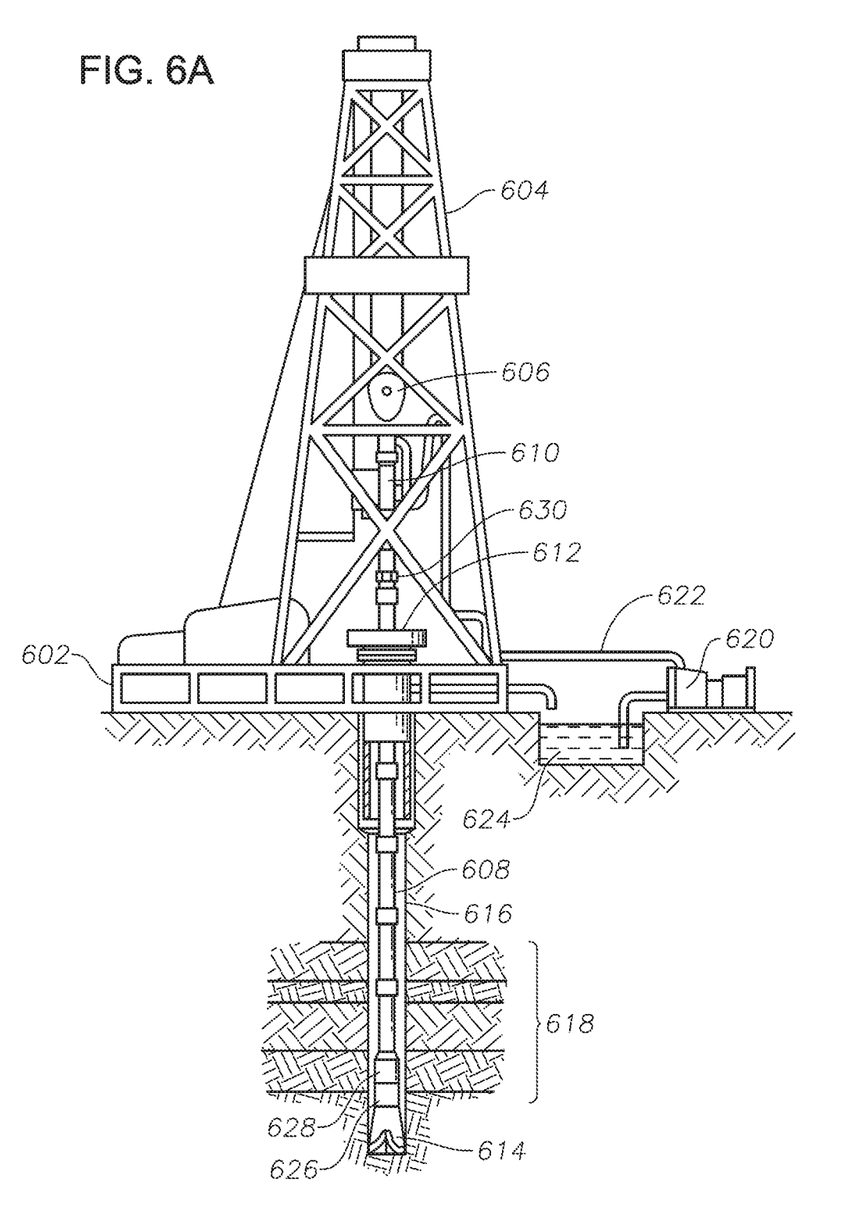
FIG. 6A illustrates an MCI logging tool, utilized in an LWD application, that acquires MCI measurement signals processed using the illustrative methods described herein.

Now that a variety of alternative workflows of the present disclosure have been described, illustrative applications will now be described. FIG. 6A illustrates an MCI logging tool, utilized in an LWD application, that acquires MCI measurement signals processed using the illustrative methods described herein. The methods described herein may be performed by a system control center located on the logging tool or may be conducted by a processing unit at a remote location, such as, for example, the surface.

FIG. 6A illustrates a drilling platform 602 equipped with a derrick 604 that supports a hoist 606 for raising and lowering a drill string 608. Hoist 606 suspends a top drive 610 suitable for rotating drill string 608 and lowering it through well head 612. Connected to the lower end of drill string 608 is a drill bit 614. As drill bit 614 rotates, it creates a wellbore 616 that passes through various layers of a formation 618. A pump 620 circulates drilling fluid through a supply pipe 622 to top drive 610, down through the interior of drill string 608, through orifices in drill bit 614, back to the surface via the annulus around drill string 608, and into a retention pit 624. The drilling fluid transports cuttings from the borehole into pit 24 and aids in maintaining the integrity of wellbore 616. Various materials can be used for drilling fluid, including, but not limited to, a salt-water based conductive mud.

An MCI logging tool 626 is integrated into the bottom-hole assembly near the bit 614. In this illustrative embodiment, MCI logging tool 626 is an LWD tool; however, in other illustrative embodiments, MCI logging tool 626 may be utilized in a wireline or tubing-conveyed logging application. In certain illustrative embodiments, MCI logging tool 626 may be adapted to perform logging operations in both open and cased hole environments.

As drill bit 614 extends wellbore 616 through formations 618, MCI logging tool 626 collects measurement signals relating to various formation properties, as well as the tool orientation and various other drilling conditions. In certain embodiments, MCI logging tool 626 may take the form of a drill collar, i.e., a thick-walled tubular that provides weight and rigidity to aid the drilling process. However, as described herein, logging tool 626 includes an induction or propagation resistivity tool to sense geology and resistivity of formations. A telemetry sub 628 may be included to transfer images and measurement data/signals to a surface receiver 630 and to receive commands from the surface. In some embodiments, telemetry sub 628 does not communicate with the surface, but rather stores logging data for later retrieval at the surface when the logging assembly is recovered.

Still referring to FIG. 6A, MCI logging tool 626 includes a system control center ("SCC"), along with necessary processing/storage/communication circuitry, that is communicably coupled to one or more sensors (not shown) utilized to acquire formation measurement signals reflecting formation parameters. In certain embodiments, once the measurement signals are acquired, the system control center calibrates the measurement signals, performs the processing methods describes herein, and then communicates the data back uphole and/or to other assembly components via telemetry sub 628. In an alternate embodiment, the system control center may be located at a remote location away from MCI logging tool 626, such as the surface or in a different borehole, and performs the processing accordingly. These and other variations within the present disclosure will be readily apparent to those ordinarily skilled in the art having the benefit of this disclosure.

The logging sensors utilized along logging tool 626 are resistivity sensors, such as, for example, magnetic or electric sensors, and may communicate in real-time. Illustrative magnetic sensors may include coil windings and solenoid windings that utilize induction phenomenon to sense conductivity of the earth formations. Illustrative electric sensors may include electrodes, linear wire antennas or toroidal antennas that utilize Ohm's law to perform the measurement. In addition, the sensors may be realizations of dipoles with an azimuthal moment direction and directionality, such as tilted coil antennas. In addition, the logging sensors may be adapted to perform logging operations in the up-hole or downhole directions. Telemetry sub 628 communicates with a remote location (surface, for example) using, for example, acoustic, pressure pulse, or electromagnetic methodologies, as will be understood by those ordinarily skilled in the art having the benefit of this disclosure.

MCI logging tool 626 may be, for example, a deep sensing induction or propagation resistivity tool. As will be understood by those ordinarily skilled in the art having the benefit of this disclosure, such tools typically include one or more transmitter and receiver coils that are axially separated along the wellbore 616. The transmitter coils generate alternating displacement currents in the formation 618 that are a function of conductivity. The alternating currents generate voltage at the one or more receiver coils. In addition to the path through the formation 618, a direct path from the transmitter coil(s) to receiver coil(s) also exists. In induction tools, signal from such path can be eliminated by the use of an oppositely wound and axially offset "bucking" coil. In propagation tools, phase and amplitude of the complex-valued voltage can be measured at certain operating frequencies. In such tools, it is also possible to measure phase difference and amplitude ratio between of the complex-valued voltages at two axially spaced receivers. Furthermore, pulse-excitation excitation and time-domain measurement signals can be used in the place of frequency domain measurement signals. Such measurement signals can be transformed into frequency measurements by utilizing a Fourier transform. The calibration methods described below are applicable to all of these signals and no limitation is intended with the presented examples. Generally speaking, a greater depth of investigation can be achieved using a larger transmitter-receiver pair spacing, but the vertical resolution of the measurement signals may suffer. Accordingly, logging tool 626 may employ multiple sets of transmitters or receivers at different positions along the wellbore 616 to enable multiple depths of investigation without unduly sacrificing vertical resolution.

Figure 6B:
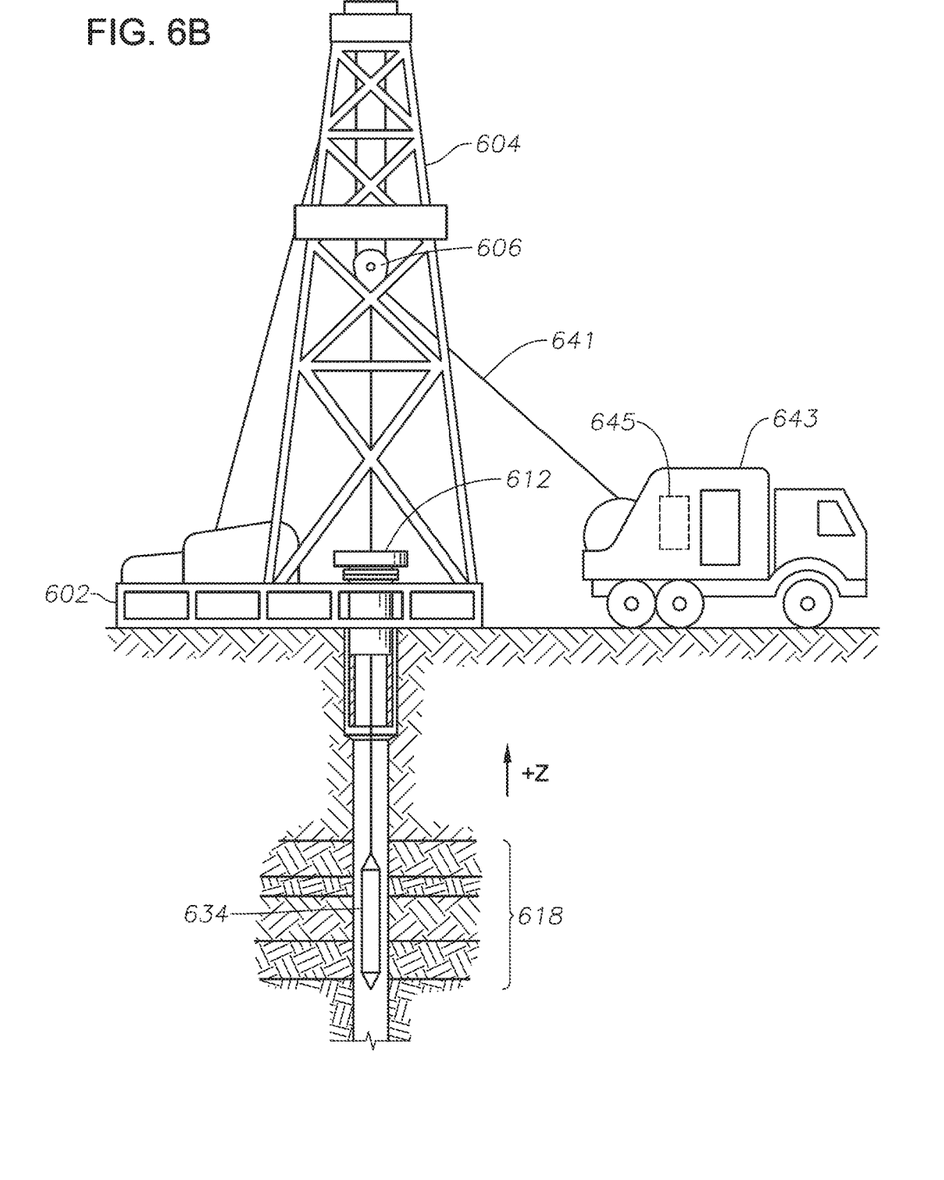
FIG. 6B illustrates an alternative embodiment of the present disclosure whereby a wireline MCI logging tool acquires and processes the MCI measurement signals.

FIG. 6B illustrates an alternative embodiment of the present disclosure whereby a wireline MCI logging tool acquires and processes the MCI measurement signals. At various times during the drilling process, drill string 608 may be removed from the borehole as shown in FIG. 6B. Once drill string 608 has been removed, logging operations can be conducted using a wireline MCI logging sonde 634, i.e., a probe suspended by a cable 641 having conductors for transporting power to the sonde and telemetry from the sonde to the surface. A wireline MCI logging sonde 634 may have pads and/or centralizing springs to maintain the tool near the axis of the borehole as the tool is pulled uphole. MCI Logging sonde 634 can include a variety of sensors including a multi-array laterolog tool for measuring formation resistivity. A logging facility 643 collects measurements from the MCI logging sonde 634, and includes a computer system 645 for processing and storing the measurements gathered by the sensors, as described herein.

In certain illustrative embodiments, the system control centers utilized by the MCI logging tools described herein include at least one processor embodied within system control center and a non-transitory and computer-readable medium, all interconnected via a system bus. Software instructions executable by the processor for implementing the illustrative MCI data processing methods described herein in may be stored in local storage or some other computer-readable medium. It will also be recognized that the MCI processing software instructions may also be loaded into the storage from a CD-ROM or other appropriate storage media via wired or wireless methods.

Moreover, those ordinarily skilled in the art will appreciate that various aspects of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Accordingly, two illustrative data processing workflows for MCI measurements based on an elliptical and circular borehole model have been presented in this disclosure. Such methods may be used to process MCI measurements in circular or elliptical wellbore environments, thus resulting in more accurate data processing.

Embodiments of the present disclosure described herein further relate to any one or more of the following paragraphs:

1. A method for processing multi-component induction ("MCI") logging measurement signals, the method comprising generating a borehole formation model based upon elliptical borehole characteristics; acquiring a MCI measurement signal of a formation using a logging tool extending along a borehole; processing the MCI measurement signal using the borehole formation model; and outputting formation property data corresponding to the processed MCI measurement signal.

2. A method as defined in paragraph 1, wherein generating the borehole formation model comprises determining the elliptical borehole characteristics; determining circular borehole characteristics that are equivalent to the elliptical borehole characteristics; and utilizing the equivalent circular borehole characteristics to generate the borehole formation model, thereby rendering the borehole formation model a circular borehole model.

3. A method as defined in paragraphs 1 or 2, wherein processing the MCI measurement signal comprises performing an inversion of the MCI measurement signal using the borehole formation model.

4. A method as defined in any of paragraphs 1-3, wherein performing the inversion comprises performing a radially one-dimensional ("R1D") inversion of the MCI measurement signal using the circular borehole model; and removing borehole effects from the MCI measurement signal using the R1D inverted MCI measurement signal.

5. A method as defined in any of paragraphs 1-4, further comprising performing a zero dimensional ("0D") inversion of the borehole corrected MCI measurement signal.

6. A method as defined in any of paragraphs 1-5, further comprising comparing the R1D and 0D inverted MCI measurement signals; and determining whether the borehole is circular or elliptical based on the comparison.

7. A method as defined in any of paragraphs 1-6, further comprising determining whether the borehole is circular or elliptical using the borehole formation model.

8. A method as defined in any of paragraphs 1-7, further comprising performing a vertically one-dimensional ("V1D") inversion of the borehole corrected MCI measurement signal.

9. A method as defined in any of paragraphs 1-8, wherein the formation property data is output as one or more of a formation horizontal resistivity, formation vertical resistivity, dip, or azimuth.

10. A method as defined in any of paragraphs 1-9, further comprising performing a radially one-dimensional ("R1D") inversion of the MCI measurement signal using the circular borehole model; performing a R1D inversion of the MCI measurement signal using an elliptical borehole model; and removing borehole effects from the MCI measurement signal using the R1D inverted measurement signal of the elliptical borehole model.

11. A method as defined in any of paragraphs 1-10, further comprising comparing the R1D inverted MCI measurement signal of the circular borehole model to the R1D inverted MCI measurement signal of the elliptical borehole model; and determining whether the borehole is circular or elliptical based on the comparison.

12. A method as defined in any of paragraphs 1-11, further comprising performing a vertically one-dimensional ("V1D") inversion of the borehole corrected MCI measurement signal.

13. A method as defined in any of paragraphs 1-12, wherein the logging tool forms part of a logging while drilling or wireline assembly.

14. A multi-component induction ("MCI") logging tool, comprising one or more sensors to acquire multi-component induction measurement signals, the sensors being communicably coupled to processing circuitry to implement a method comprising generating a borehole formation model based upon elliptical borehole characteristics; acquiring an MCI measurement signal of a formation; processing the MCI measurement signal using the borehole formation model; and outputting formation property data corresponding to the processed MCI measurement signal.

15. A logging tool as defined in paragraph 14, wherein generating the borehole formation model comprises determining the elliptical borehole characteristics; determining circular borehole characteristics that are equivalent to the elliptical borehole characteristics; and utilizing the equivalent circular borehole characteristics to generate the borehole formation model, thereby rendering the borehole formation model a circular borehole model.

16. A logging tool as defined in paragraphs 14 or 15, wherein processing the MCI measurement signal comprises performing an inversion of the MCI measurement signal using the borehole formation model.

17. A logging tool as defined in any of paragraphs 14-16, wherein performing the inversion comprises performing a radially one-dimensional ("R1D") inversion of the MCI measurement signal using the circular borehole model; and removing borehole effects from the MCI measurement signal using the R1D inverted MCI measurement signal.

18. A logging tool as defined in any of paragraphs 14-17, further comprising performing a zero dimensional ("0D") inversion of the borehole corrected MCI measurement signal.

19. A logging tool as defined in any of paragraphs 14-18, further comprising comparing the R1D and 0D inverted MCI measurement signals; and determining whether the borehole is circular or elliptical based on the comparison.

20. A logging tool as defined in any of paragraphs 14-19, further comprising determining whether the borehole is circular or elliptical using the borehole formation model.

21. A logging tool as defined in any of paragraphs 14-20, further comprising performing a vertically one-dimensional ("V1D") inversion of the borehole corrected MCI measurement signal.

22. A logging tool as defined in any of paragraphs 14-21, wherein the formation property data is output as one or more of a formation horizontal resistivity, formation vertical resistivity, dip, or azimuth.

23. A logging tool as defined in any of paragraphs 14-22, further comprising performing a radially one-dimensional ("R1D") inversion of the MCI measurement signal using the circular borehole model; performing a R1D inversion of the MCI measurement signal using an elliptical borehole model; and removing borehole effects from the MCI measurement signal using the R1D inverted measurement signal of the elliptical borehole model.

24. A logging tool as defined in any of paragraphs 14-23, further comprising: comparing the R1D inverted MCI measurement signal of the circular borehole model to the R1D inverted MCI measurement signal of the elliptical borehole model; and determining whether the borehole is circular or elliptical based on the comparison.

25. A logging tool as defined in any of paragraphs 14-24, further comprising performing a vertically one-dimensional ("V1D") inversion of the borehole corrected MCI measurement signal.

26. A logging tool as defined in any of paragraphs 14-25, wherein the logging tool forms part of a logging while drilling or wireline assembly.

27. A logging tool as defined in any of paragraphs 14-26, wherein the logging tool forms part of a wireline or drilling assembly.

28. A non-transitory computer-readable medium comprising instructions which, when executed by at least one processor, causes the processor to perform a method comprising generating a borehole formation model based upon elliptical borehole characteristics; acquiring a multi-component induction ("MCI") measurement signal of a formation using a logging tool extending along a borehole; processing the MCI measurement signal using the borehole formation model; and outputting formation property data corresponding to the processed MCI measurement signal.

29. A computer-readable medium as defined in paragraph 28, wherein generating the borehole formation model comprises determining the elliptical borehole characteristics; determining circular borehole characteristics that are equivalent to the elliptical borehole characteristics; and utilizing the equivalent circular borehole characteristics to generate the borehole formation model, thereby rendering the borehole formation model a circular borehole model.

30. A computer-readable medium as defined in paragraphs 28 or 29, wherein processing the MCI measurement signal comprises performing an inversion of the MCI measurement signal using the borehole formation model.

31. A computer-readable medium as defined in any of paragraphs 28-30, wherein performing the inversion comprises performing a radially one-dimensional ("R1D") inversion of the MCI measurement signal using the circular borehole model; and removing borehole effects from the MCI measurement signal using the R1D inverted MCI measurement signal.

32. A computer-readable medium as defined in any of paragraphs 28-31, further comprising performing a zero dimensional ("0D") inversion of the borehole corrected MCI measurement signal.

33. A computer-readable medium as defined in any of paragraphs 28-32, further comprising comparing the R1D and 0D inverted MCI measurement signals; and determining whether the borehole is circular or elliptical based on the comparison.

34. A computer-readable medium as defined in any of paragraphs 28-33, further comprising determining whether the borehole is circular or elliptical using the borehole formation model.

35. A computer-readable medium as defined in any of paragraphs 28-34, further comprising performing a vertically one-dimensional ("V1D") inversion of the borehole corrected MCI measurement signal.

36. A computer-readable medium as defined in any of paragraphs 28-35, wherein the formation property data is output as one or more of a formation horizontal resistivity, formation vertical resistivity, dip, or azimuth.

37. A computer-readable medium as defined in any of paragraphs 28-36, further comprising performing a radially one-dimensional ("R1D") inversion of the MCI measurement signal using the circular borehole model; performing a R1D inversion of the MCI measurement signal using an elliptical borehole model; and removing borehole effects from the MCI measurement signal using the R1D inverted measurement signal of the elliptical borehole model.

38. A computer-readable medium as defined in any of paragraphs 28-37, further comprising comparing the R1D inverted MCI measurement signal of the circular borehole model to the R1D inverted MCI measurement signal of the elliptical borehole model; and determining whether the borehole is circular or elliptical based on the comparison.

39. A computer-readable medium as defined in any of paragraphs 28-38, further comprising performing a vertically one-dimensional ("V1D") inversion of the borehole corrected MCI measurement signal.

Moreover, the foregoing paragraphs and other methods described herein may be embodied within a system comprising processing circuitry to implement any of the methods, or a in a non-transitory computer-readable medium comprising instructions which, when executed by at least one processor, causes the processor to perform any of the methods described herein.

Although various embodiments and methods have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method for processing multi-component induction ("MCI") logging measurement signals, the method comprising:
    generating a borehole formation model based upon elliptical borehole characteristics;
    acquiring a MCI measurement signal of a formation using a logging tool extending along a borehole;
    processing the MCI measurement signal using the borehole formation model; and
    outputting formation property data corresponding to the processed MCI measurement signal,
    wherein processing the MCI measurement signal comprises performing an inversion of the MCI measurement signal using the borehole formation model, and
    wherein performing the inversion comprises:
        performing a radially one-dimensional ("R1D") inversion of the MCI measurement signal using the borehole formation model; and
        removing borehole effects from the MCI measurement signal using the R1D inverted MCI measurement signal.

2. A method as defined in claim 1, wherein generating the borehole formation model comprises:
    determining the elliptical borehole characteristics;
    determining circular borehole characteristics that are equivalent to the elliptical borehole characteristics; and
    utilizing the equivalent circular borehole characteristics to generate the borehole formation model, thereby rendering the borehole formation model a circular borehole model.

3. A method as defined in claim 1, further comprising performing a zero dimensional ("0D") inversion of the borehole corrected MCI measurement signal.

4. A method as defined in claim 3, further comprising:
    comparing the R1D and 0D inverted MCI measurement signals; and
    determining whether the borehole is circular or elliptical based on the comparison.

5. A method as defined in claim 1, further comprising determining whether the borehole is circular or elliptical using the borehole formation model.

6. A method as defined in claim 1, further comprising performing a vertically one-dimensional ("V1D") inversion of the borehole corrected MCI measurement signal.

7. A method as defined in claim 1, wherein the formation property data is output as one or more of a formation horizontal resistivity, formation vertical resistivity, dip, or azimuth.

8. A method as defined in claim 1, wherein the logging tool forms part of a logging while drilling or wireline assembly.

9. A multi-component induction ("MCI") logging tool, comprising one or more sensors to acquire multi-component induction measurement signals, the sensors being communicably coupled to processing circuitry to implement a method comprising:
    generating a borehole formation model based upon elliptical borehole characteristics;
    acquiring an MCI measurement signal of a formation;
    processing the MCI measurement signal using the borehole formation model; and
    outputting formation property data corresponding to the processed MCI measurement signal,
    wherein processing the MCI measurement signal comprises performing an inversion of the MCI measurement signal using the borehole formation model, and
    wherein performing the inversion comprises:
        performing a radially one-dimensional ("R1D") inversion of the MCI measurement signal using the borehole formation model; and
        removing borehole effects from the MCI measurement signal using the R1D inverted MCI measurement signal.

10. A logging tool as defined in claim 9, wherein generating the borehole formation model comprises:
    determining the elliptical borehole characteristics;
    determining circular borehole characteristics that are equivalent to the elliptical borehole characteristics; and
    utilizing the equivalent circular borehole characteristics to generate the borehole formation model, thereby rendering the borehole formation model a circular borehole model.

11. A logging tool as defined in claim 9, further comprising performing a zero dimensional ("0D") inversion of the borehole corrected MCI measurement signal.

12. A logging tool as defined in claim 11, further comprising:
    comparing the R1D and 0D inverted MCI measurement signals; and
    determining whether the borehole is circular or elliptical based on the comparison.

13. A logging tool as defined in claim 9, further comprising determining whether the borehole is circular or elliptical using the borehole formation model.

14. A logging tool as defined in claim 9, further comprising performing a vertically one-dimensional ("V1D") inversion of the borehole corrected MCI measurement signal.

15. A logging tool as defined in claim 9, wherein the formation property data is output as one or more of a formation horizontal resistivity, formation vertical resistivity, dip, or azimuth.

16. A logging tool as defined in claim 9, wherein the logging tool forms part of a logging while drilling or wireline assembly.

17. A logging tool as defined in claim 9, wherein the logging tool forms part of a wireline or drilling assembly.

18. A non-transitory computer-readable medium comprising instructions which, when executed by at least one processor, causes the processor to perform a method comprising:
generating a borehole formation model based upon elliptical borehole characteristics;
acquiring a multi-component induction ("MCI") measurement signal of a formation using a logging tool extending along a borehole;
processing the MCI measurement signal using the borehole formation model,
wherein processing the MCI measurement signal comprises performing an inversion of the MCI measurement signal using the borehole formation model,
wherein performing the inversion comprises:
performing a radially one-dimensional ("R1D") inversion of the MCI measurement signal using the circular borehole model; and
removing borehole effects from the MCI measurement signal using the R1D inverted MCI measurement signal; and
outputting formation property data corresponding to the processed MCI measurement signal.

19. A computer-readable medium as defined in claim 18, wherein generating the borehole formation model comprises:
deter-mining the elliptical borehole characteristics;
determining circular borehole characteristics that are equivalent to the elliptical borehole characteristics; and
utilizing the equivalent circular borehole characteristics to generate the borehole formation model, thereby rendering the borehole formation model a circular borehole model.

20. A computer-readable medium as defined in claim 18, further comprising performing a zero dimensional ("0D") inversion of the borehole corrected MCI measurement signal.

21. A computer-readable medium as defined in claim 20, further comprising:
comparing the R1D and 0D inverted MCI measurement signals; and
determining whether the borehole is circular or elliptical based on the comparison.

22. A computer-readable medium as defined in claim 18, further comprising determining whether the borehole is circular or elliptical using the borehole formation model.

23. A computer-readable medium as defined in claim 18, further comprising performing a vertically one-dimensional ("V1D") inversion of the borehole corrected MCI measurement signal.

24. A computer-readable medium as defined in claim 18, wherein the formation property data is output as one or more of a formation horizontal resistivity, formation vertical resistivity, dip, or azimuth.

25. A method for processing multi-component induction ("MCI") logging measurement signals, the method comprising:
generating a borehole formation model based upon elliptical borehole characteristics, wherein generating the borehole formation model comprises:
determining the elliptical borehole characteristics;
determining circular borehole characteristics that are equivalent to the elliptical borehole characteristics; and
utilizing the equivalent circular borehole characteristics to generate the borehole formation model, thereby rendering the borehole formation model a circular borehole model;
acquiring a MCI measurement signal of a formation using a logging tool extending along a borehole;
processing the MCI measurement signal using the borehole formation model, wherein processing the MCI measurement signal comprises:
performing a radially one-dimensional ("R1D") inversion of the MCI measurement signal using the circular borehole model;
performing a R1D inversion of the MCI measurement signal using an elliptical borehole model; and
removing borehole effects from the MCI measurement signal using the R1D inverted measurement signal of the elliptical borehole model; and
outputting formation property data corresponding to the processed MCI measurement signal.

26. A method as defined in claim 25, further comprising determining whether the borehole is circular or elliptical using the borehole formation model.

27. A method as defined in claim 25, wherein the formation property data is output as one or more of a formation horizontal resistivity, formation vertical resistivity, dip, or azimuth.

28. A method as defined in claim 25, further comprising:
comparing the R1D inverted MCI measurement signal of the circular borehole model to the R1D inverted MCI measurement signal of the elliptical borehole model; and
determining whether the borehole is circular or elliptical based on the comparison.

29. A method as defined in claim 25, further comprising performing a vertically one-dimensional ("V1D") inversion of the borehole corrected MCI measurement signal.

30. A method as defined in claim 25, wherein the logging tool forms part of a logging while drilling or wireline assembly.

31. A multi-component induction ("MCI") logging tool, comprising one or more sensors to acquire multi-component induction measurement signals, the sensors being communicably coupled to processing circuitry to implement a method comprising:
generating a borehole formation model based upon elliptical borehole characteristics, wherein generating the borehole formation model comprises:
determining the elliptical borehole characteristics;
determining circular borehole characteristics that are equivalent to the elliptical borehole characteristics; and
utilizing the equivalent circular borehole characteristics to generate the borehole formation model, thereby rendering the borehole formation model a circular borehole model;
acquiring an MCI measurement signal of a formation;
processing the MCI measurement signal using the borehole formation model, wherein the processing comprises:
performing a radially one-dimensional ("R1D") inversion of the MCI measurement signal using the circular borehole model;
performing a R1D inversion of the MCI measurement signal using an elliptical borehole model; and removing borehole effects from the MCI measurement signal using the R1D inverted measurement signal of the elliptical borehole model; and outputting formation property data corresponding to the processed MCI measurement signal.

32. A logging tool as defined in claim 31, further comprising determining whether the borehole is circular or elliptical using the borehole formation model.

33. A logging tool as defined in claim 31, wherein the formation property data is output as one or more of a formation horizontal resistivity, formation vertical resistivity, dip, or azimuth.

34. A logging tool as defined in claim 31, further comprising:

comparing the R1D inverted MCI measurement signal of the circular borehole model to the R1D inverted MCI measurement signal of the elliptical borehole model; and determining whether the borehole is circular or elliptical based on the comparison.

35. A logging tool as defined in claim 31, further comprising performing a vertically one-dimensional ("V1D") inversion of the borehole corrected MCI measurement signal.

36. A logging tool as defined in claim 31, wherein the logging tool forms part of a logging while drilling or wireline assembly.

37. A logging tool as defined in claim 31, wherein the logging tool forms part of a wireline or drilling assembly.

38. A non-transitory computer-readable medium comprising instructions which, when executed by at least one processor, causes the processor to perform a method comprising:

generating a borehole formation model based upon elliptical borehole characteristics, wherein generating the borehole formation model comprises:
    determining the elliptical borehole characteristics;
    determining circular borehole characteristics that are equivalent to the elliptical borehole characteristics; and
    utilizing the equivalent circular borehole characteristics to generate the borehole formation model, thereby rendering the borehole formation model a circular borehole model;

acquiring a multi-component induction ("MCI") measurement signal of a formation using a logging tool extending along a borehole;

processing the MCI measurement signal using the borehole formation model, wherein processing the MCI measurement signal comprises:
    performing a radially one-dimensional ("R1D") inversion of the MCI measurement signal using the circular borehole model;
    performing a R1D inversion of the MCI measurement signal using an elliptical borehole model; and
    removing borehole effects from the MCI measurement signal using the R1D inverted measurement signal of the elliptical borehole model; and outputting formation property data corresponding to the processed MCI measurement signal.

39. A non-transitory computer-readable medium as defined in claim 38, further comprising determining whether the borehole is circular or elliptical using the borehole formation model.

40. A non-transitory computer-readable medium as defined in claim 38, wherein the formation property data is output as one or more of a formation horizontal resistivity, formation vertical resistivity, dip, or azimuth.

41. A non-transitory computer-readable medium as defined in claim 38, further comprising:

comparing the R1D inverted MCI measurement signal of the circular borehole model to the R1D inverted MCI measurement signal of the elliptical borehole model; and determining whether the borehole is circular or elliptical based on the comparison.

42. A non-transitory computer-readable medium as defined in claim 38, further comprising performing a vertically one-dimensional ("V1D") inversion of the borehole corrected MCI measurement signal.

* * * * *